United States Patent [19]

Ho

[11] 4,316,159
[45] Feb. 16, 1982

[54] REDUNDANT MICROWAVE SWITCHING MATRIX

[75] Inventor: Pang T. Ho, Mountain View, Calif.

[73] Assignee: RCA Corporation, New York, N.Y.

[21] Appl. No.: 5,385

[22] Filed: Jan. 22, 1979

[51] Int. Cl.³ .............................................. H01P 1/15;
[52] U.S. Cl. .............................. 333/104; 179/18 GF;
333/116
[58] Field of Search ................. 333/101, 103, 104, 116;
330/124 D; 361/416; 340/166 R; 166 S,
340/147 SC; 179/18 GF

[56] References Cited

U.S. PATENT DOCUMENTS

3,813,497  5/1974  Wachs et al. .................. 179/18 GF
4,165,497  8/1979  Irons ................................. 333/104

Primary Examiner—Paul L. Gensler
Attorney, Agent, or Firm—Samuel Cohen; Robert L. Troike; Christopher L. Maginniss

[57] ABSTRACT

A redundant microwave switching matrix providing equal power distribution of any of a plurality of microwave input signals among one or more of a plurality of microwave output signals. The redundant switching matrix used in a communication satellite selectively couples one or more of a plurality of input microwave signals received by receiving antennas among one or more of a plurality of output microwave signals radiated by transmitting antennas. The means for coupling the input and output microwave signals is provided by a pair of directional couplers diametrically positioned at each coordinate of the switching matrix. A controller selectively enables a pair of PIN diodes, internally positioned within each directional coupler, to perform the desired coupling. Diametrically positioned directional couplers, having a pair of PIN diodes, provide a highly reliable and flexibility microwave switching matrix.

5 Claims, 4 Drawing Figures

REDUNDANT MICROWAVE SWITCHING MATRIX

BACKGROUND OF THE INVENTION

1. Field of the Invention

This invention relates to a redundant microwave switching matrix and more particularly to a microwave switching matrix having functional and device redundancy that distributes one or more of a plurality of microwave input signals equally among one or more of a plurality of microwave output ports.

2. Description of the Prior Art

In microwave systems, such as a microwave communications system, it is necessary that a switching network be provided to distribute input signals among one or more output ports associated with transmitting devices such as antennas.

Microwave switching devices placed in an unmanned environment, such as an orbiting communication satellite, must be highly reliable and flexible, such that, one failure in the switching device will not prevent the satellite from performing its operative functions. It is known to provide emergency paths in microwave switching devices to circumvent the problem of one failure causing a complete microwave system to be inoperative. Such a microwave switching device is described in U.S. Pat. No. 3,833,866, entitled, "Microwave Switching Matrix," issued Sept. 3, 1974 to Paul Boutelant.

It is also known in the microwave art to provide redundant microwave switching paths to obtain high reliability. Such a system is described in U.S. Pat. No. 4,070,637 entitled "Redundant Microwave Configuration," issued Jan. 24, 1978, to F. T. Assal, et al.

Although emergency and redundant paths are known as a means to improve the reliability of a microwave switching matrix, the switching matrix must perform its major function, such as distributing an input microwave signal equally to its output ports under single failure conditions. Thus, providing a microwave switching matrix with both redundancy and equal distribution of microwave signals to output ports will fulfill a need in the microwave art.

SUMMARY OF THE INVENTION

A redundant microwave switching matrix providing equal power distribution of one or more of a plurality of microwave input signals among one or more of a plurality of microwave output signals. The microwave switching matrix comprises a plurality of strip transmission lines, a plurality of microwave power dividers, and a plurality of microwave switches. The plurality of microwave strip transmission lines are arranged into a matrix of row and column coordinates. A pair of microwave power dividers are positioned diametrically opposite each other at each row-column coordinate, each power divider coupling a predetermined power ratio of a signal conducted by the horizontal and strip transmission lines whereby the power of an incident signal conducted by any horizontal strip transmission lines is equally divided among one or more of the vertical strip transmission lines. A pair of microwave switches are positioned on each of the power dividers and respond to an electrical signal to switch the coupled signal conducted by the horizontal strip transmission lines to the vertical strip transmission lines.

DETAILED DESCRIPTION OF THE PREFERRED EMBODIMENT

Figure 1:
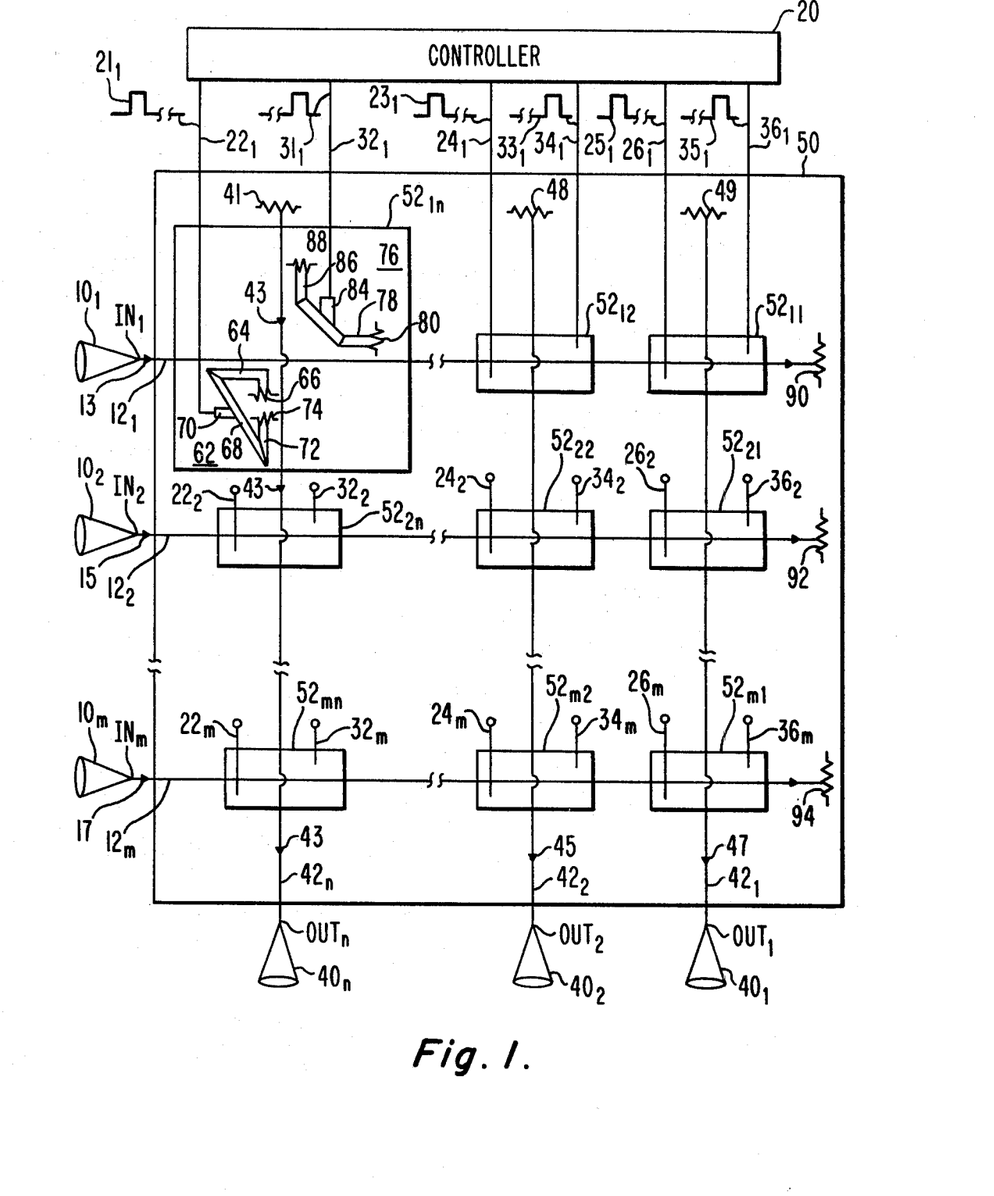
FIG. 1 is a block schematic of an apparatus of one embodiment of the invention.

FIG. 1 illustrates the arrangement and organization of the main components of one embodiment of the microwave switching matrix 50 according to this invention operating with a controller 20.

Matrix 50 is formed of horizontal strip transmission lines $12_1$, $12_2$ ... $12_m$ for conducting input signals $IN_1$, $IN_2$, ... $IN_m$ in the direction of arrows 13, 15 ... 17, respectively. Strip transmission lines $12_1$, $12_2$, ... $12_m$ are terminated with loads 90, 92 ... 94, respectively, matched to the characteristic impedance of lines $12_1$, $12_2$ ... $12_m$. Further microwave switching matrix 50 is formed of vertical strip transmission lines, $42_n$ ... $42_2$ and $42_1$ to conduct output signals $OUT_n$ ... $OUT_2$ and $OUT_1$, in the direction of arrows 43 ... 45, 47 respectively. Strip transmission lines $42_n$ ... $42_2$ and $42_1$, are terminated with loads 41 ... 48 and 49, respectively, matched to the characteristic impedance of lines $42_n$ ... $42_2$ and $42_1$.

Input signals $IN_1$, $IN_2$ ... $IN_m$ are typically microwave signals received by a communication spot beam receiving antennas $10_1$, $10_2$, ... $10_m$ respectively. Receiving antennas $10_1$, $10_2$, ... $10_m$ are typically oriented on a communication satellite to receive information from particular zones 1, 2, ... m, respectively, corresponding to particular locations 1, 2, ... m on the earth. Output signals $OUT_n$ ... $OUT_2$ and $OUT_1$ are typically microwave signals that are radiated by communication spot beam transmitting antennas $40_n$ ... $40_2$ and $40_1$ respectively. Transmitting antennas $40_n$ ... $40_2$ and $40_1$ are typically oriented on the communication satellite to transmit information to particular zones n ... 2 and 1 associated with particular ground support stations. It should be recognized that antennas $10_1$, $10_2$ ... $10_m$, $40_n$ ... $40_2$ and $40_1$ may be transducer devices that both receive and transmit microwave signals. Switching matrix 50, is typically a satellite microwave switching matrix that selectively distributes the input signals $IN_1$, $IN_2$, ... $IN_m$ among one or more output signals $OUT_n$ ... $OUT_2$ and $OUT_1$ for transmission by antennas $40_n$ ... $40_2$ and $40_1$ respectively.

The switching matrix 50 provides a constant power insertion loss from any input signal $IN_1$, $IN_2$ ... or $IN_m$ to any output signal $OUT_n$ ... $OUT_2$ or $OUT_1$. In the communication systems, utilizing satellites, it is preferrable to have all the input signals $IN_1$, $IN_2$, ... $IN_m$ to matrix 50 at the same power level so that the power level of output signals $OUT_n$ ... $OUT_2$ and $OUT_1$ is equal. However, the only requirement is the power level of output signals $OUT_n$ ... $OUT_2$ and $OUT_1$ be of a sufficient level to be accepted and transmitted by antennas $40_n$ ... $40_2$ and $40_1$ respectively. Some communication satellites use a time division multiple access (TDMA) digital transmission technique. The frequency of signals $IN_1$, $IN_2$, ... $IN_m$ overlap the frequency domain assigned to a receiving satellite. The signals $IN_1$, $IN_2$ ... $IN_m$ occur in sequence within the time domain of the receiving satellite. The microwave input signals will be referred to hereinafter as signals $IN_1$, $IN_2$ ... $IN_m$ and the microwave output signals will be referred to as signals $OUT_n$ ... $OUT_2$, $OUT_1$.

Transmission lines $12_1$, $12_2$ ... $12_m$, $42_n$ ... $42_2$ and $42_1$ may be either (i) an asymmetrical configuration, called a "microstrip" using a single ground plane on one side of a substrate and a narrow conductive strip on the opposite side of the substrate, (ii) a symmetrical configuration, commonly called a "stripline," having two ground planes on opposite sides of a narrow conductive strip, each ground plane being spaced from the narrow conductive strip by a dielectric layer, or (iii) a "surface strip transmission line" configuration described by C. P. Wen in the IEEE 1969 G-MTT (Group on Microwave Theory and Techniques) International Microwave Symposium Digest, May 1969, under a title of "A Surface Strip Transmission Line for Nonreciprocal Gyromagnetic Device Applications." In a surface strip transmission line configuration, a narrow conductor is spaced a short distance from a wider conductor and both are on the same surface of the dielectric substrate. The preferred embodiment of this invention uses a "microstrip" as the conductive elements for the input and output microwave signals $IN_1$, $IN_2$ ... $IN_m$ and $OUT_n$, ... $OUT_2$, $OUT_1$.

As shown in FIG. 1, horizontal microstrips $12_1$, $12_2$ ... $12_m$ and vertical microstrips $42_n$ ... $42_2$ and $42_1$, are arranged respectively in a row and column matrix to form switching matrix 50. Switching matrix 50 may have any number of rows and columns typically termed an m×n matrix. Positioned at each row/column coordinate is a microwave power divider such as a directional coupler 52 mn. The first subscript m of any directional coupler 52 mn indicates its row position within matrix 50 and the second subscript n indicates its column position within matrix 50. Directional coupler 52 mn is comprised of two directional couplers 62 and 76. As will be described hereinafter, directional couplers 62 and 76 are selected from conventional quadrature and interdigitated edge couplers. The selection of either a quadrature or a interdigitated directional coupler for directional couplers 62 and 76 is determined by the input and output power coupling coefficients required for each directional coupler 62 or 76. The input and output coupling coefficients of directional couplers 62 and 76 are chosen such that the power of one or more signals $IN_1$, $IN_2$ ... $IN_m$ is equally divided among one or more of signals $OUT_n$ ... $OUT_2$ and $OUT_1$. The required input and output power coupling coefficients for each of the directional couplers 62 and 76 are determined by the placement of directional couplers 62 and 76 within matrix 50. Thus, it should be recognized that although the same reference numbers 62 and 76 are used to represent all the directional couplers at each co-ordinate within matrix 50, the directional couplers 62 and 76 have different design parameters and are accordingly not the same.

Directional couplers 62 and 76 are positioned diametrically opposite each other at each matrix 50 coordinate. Directional coupler 62 as shown in FIG. 1 comprises three microstrip segments, 64, 68, and 72, terminating load 66 for microstrip segment 64, terminating load 74 for microstrip segment 72, and a microwave switch 70. Terminating loads 66 and 74 have a value of impedance substantially equal to the value of the impedance of loads 90 and thus the characteristic impedance of microstrip $12_1$. Directional coupler 76 comprises elements 78, 82, 86, 80, 88 and 84 which are similar to elements 64, 68, 72, 66, 74 and 70, respectively, of directional coupler 62. It should be recognized that directional couplers 62 and 76, comprised of quadrature and interdigitated couplers do not, in practice, have the structure depicted in FIG. 1. Thus, schematic drawing symbols used in FIG. 1 for directional couplers 62 and 76 are for illustrative purposes only.

The power coupling coefficients for directional couplers 62 and 76 are dependent upon the total number of directional couplers 62 and 76 within matrix 50.

Figure 3:
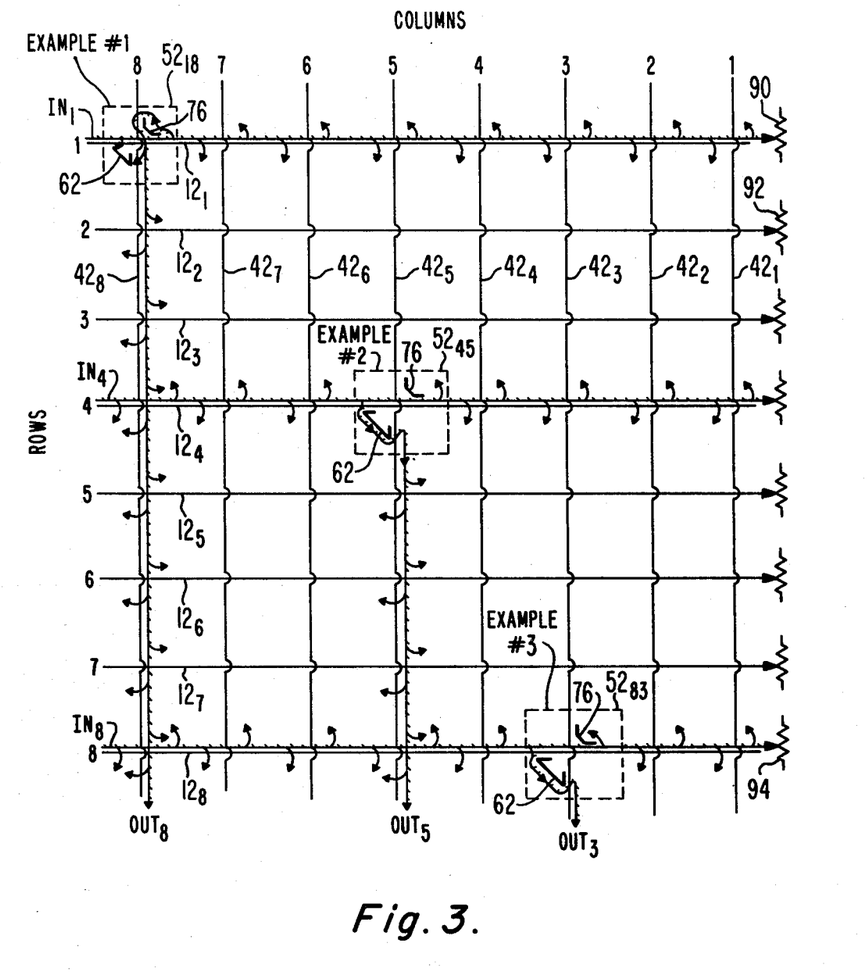
FIG. 3 is a schematic of an 8×8 switching matrix.

The total number of directional couplers 62 and 76 is determined by the number of rows and columns that are provided in switching matrix 50. In order to discuss representative values for the power coupling co-efficients of directional couplers 62 and 76, an 8×8 matrix is given as an example as shown in FIG. 3.

The power coupling coefficients for directional couplers 62 and 76 are subdivided into input and output power coupling coefficients. The desired input power coupling coefficient $IPCC_{62,C}$ for coupler 62 is given by the following equation:

$$IPCC_{62,C} = \frac{1}{2C + 1} \quad (1)$$

where C is the column in the matrix 50 where coupler 62 is positioned. The required input power coupling coefficient ($IPCC_{76,C}$) for coupler 76 is given by the following equation:

$$IPPCC_{76,C} = \frac{1}{2C} \quad (2)$$

where C is the column in the matrix 50 where coupler 76 is positioned.

The desired output power coupling co-efficients ($OPCC_{62,R}$) for coupler 62 is given by the following equation:

$$OPCC_{62,R} = \frac{1}{2R + 1} \quad (3)$$

where R is the row in the matrix 50 where coupler 62 is positioned. The desired output power coupling coefficient ($OPCC_{76,R}$) for coupler 76, is given by the following equation:

$$OPCC_{76,R} = \frac{1}{2R} \quad (4)$$

where R is the row in the matrix where coupler 76 is located.

In order to demonstrate the use of equations (1)–(4), related to the coordinate placement of directional couplers 62 and 76 within the switching matrix 50, the following Examples 1–3 are given in conjunction with FIG. 3.

| Example (1) | Example 2 | Example 3 |
|---|---|---|
| Equation 1 | | |

-continued

| Example (1) | Example 2 | Example 3 |
|---|---|---|
| $IPCC_{62,8} = \frac{1}{2C+1}$ | $IPCC_{62,5} = \frac{1}{2C+1}$ | $IPCC_{62,3} = \frac{1}{2C+1}$ |
| $= \frac{1}{2(8)+1}$ | $= \frac{1}{(2)(5)+1}$ | $= \frac{1}{(2)(3)+1}$ |
| $= \frac{1}{17}$ | $= \frac{1}{11}$ | $= \frac{1}{7}$ |

Equation (2):

| | | |
|---|---|---|
| $IPCC_{76,8} = \frac{1}{2C}$ | $IPCC_{76,5} = \frac{1}{2C}$ | $IPCC_{76,3} = \frac{1}{2C}$ |
| $= \frac{1}{(2)(8)}$ | $= \frac{1}{(2)(5)}$ | $= \frac{1}{(2)(3)}$ |
| $= \frac{1}{16}$ | $= \frac{1}{10}$ | $= \frac{1}{6}$ |

Equation (3):

| | | |
|---|---|---|
| $OPCC_{76,1} = \frac{1}{2R+1}$ | $OPCC_{62,4} = \frac{1}{2R+1}$ | $OPCC_{62,8} = \frac{1}{2R+1}$ |
| $= \frac{1}{(2)(1)+1}$ | $= \frac{1}{(2)(4)+1}$ | $= \frac{1}{(2)(8)+1}$ |
| $= \frac{1}{3}$ | $= \frac{1}{9}$ | $= \frac{1}{17}$ |

Equation (4):

| | | |
|---|---|---|
| $OPCC_{76,1} = \frac{1}{2R}$ | $OPCC_{76,4} = \frac{1}{2R}$ | $OPCC_{76,8} = \frac{1}{2R}$ |
| $= \frac{1}{(2)(1)}$ | $= \frac{1}{(2)(4)}$ | $= \frac{1}{(2)(8)}$ |
| $= \frac{1}{2}$ | $= \frac{1}{8}$ | $= \frac{1}{16}$ |

Equations (1)–(4) are used to determine the proper input and output power coupling coefficients for each directional couplers 62 and 76 positioned at each coordinate (C,R) of matrix 50. For the 8×8 matrix shown in FIG. 3 the input and output power coupling coefficients have a range from 1/17 (12.3db) to ½ (3.0db). This required range of power coupling coefficients for directional couplers 62 and 76 may be provided by conventional directional couplers such as quadrature and interdigitated edge couplers. Conventional quadrature couplers provide the power coupling coefficients for 8×8 matrix from the range of 1/17 (12.3 db) to ¼ (6.0 db). Similarly conventional interdigitated couplers provide the power coupling coefficients of ½ (3.0 db) and ⅓ (4.8 db). The following Table I lists suitable quadrature and interdigitated directional couplers having the required power coupling range 1/17 to ¼ and ⅓ to ½, respectively, that are selected to provide the required directional couplers 62 and 76 for the 8×8 matrix illustrated in FIG. 3.

ary, 1978, pp. 70–79 describes other types of directional couplers having the required coupling coefficient that may be used with the invention. Further, an article by L. S. Napoli, et al., entitled "Characteristics of Coupled Microstrip Lines," published in RCA Reviews, September, 1970, Vol. 31, No. 3, pp. 470–498 discusses the various parameters of quadrature couplers. Still further, see an article by R. Horton entitled, "Loss and Sensitivity of the Lange Coupler," published in Electronics Letters, June, 1978, Vol. 4, 13, pp. 391–393, for a discussion of the parameters of an interdigitated coupler, referred to as Lange Coupler in the article, that may be used in the practice of this invention.

As shown in FIG. 1, controller 20 is connected to the plurality of directional couplers 62 via signal paths $22_1$, $22_2 \ldots 22_m$, $24_1$, $24_2 \ldots 24_m$, $\ldots 26_1$, $26_2 \ldots 26_m$ for conducting electrical signals $21_1$, $21_2 \ldots 21_m$, $23_1$, $23_2 \ldots 23_m$, $\ldots 25_1$, $25_2 \ldots$ and $25_m$ respectively. Electrical signals $21_2-21_m$, $23_2-23_m$, $\ldots$ and $25_2-25_m$ are not shown but are similar to $21_1$, $23_1 \ldots$ and $25_1$ respec-

TABLE I

Suitable Type Directional Couplers 62 and 76

| Power Coupling Coefficient | $\frac{1}{17}$ | $\frac{1}{16}$ | $\frac{1}{15}$ | $\frac{1}{14}$ | $\frac{1}{13}$ | $\frac{1}{12}$ | $\frac{1}{11}$ | $\frac{1}{10}$ | $\frac{1}{9}$ | $\frac{1}{8}$ | $\frac{1}{7}$ | $\frac{1}{6}$ | $\frac{1}{5}$ | $\frac{1}{4}$ | $\frac{1}{3}$ | $\frac{1}{2}$ |
|---|---|---|---|---|---|---|---|---|---|---|---|---|---|---|---|---|
| Coupling in db | 12.3 | 12 | 11.8 | 11.5 | 11.1 | 10.8 | 10.4 | 10 | 9.5 | 9 | 8.5 | 7.8 | 7 | 6 | 4.8 | 3 |

It should be recognized the invention is not limited to the use of quadrature and interdigitated type couplers. The couplers illustrated are only representative of any number of conventional microwave couplers available in the practice of this invention. An article by A. W. Morse, entitled, "Modified Combiner Designs to Team High Power Amplifier," published in Microwave, Janutively. Controller 20 is also connected to the plurality of directional coupler 76 via signals paths $32_1$, $32_2 \ldots 32_m$, $34_1 \ldots 34_2$, $34_m$, $\ldots 36_1$, $36_2$, and $\ldots 36_m$ for conducting electrical signals $31_1$, $31_2 \ldots 31_m$, $33_1$, $33_2 \ldots 33_m$, $\ldots 35_1$, $35_2 \ldots$ and $35_m$ respectively. Electrical signals $31_2-31_m$, $33_2-33_m$, ... $35_2-35_m$ are not shown but are similar to $31_1$, $33_1$ ... and $35_1$ respectively.

Figure 2:
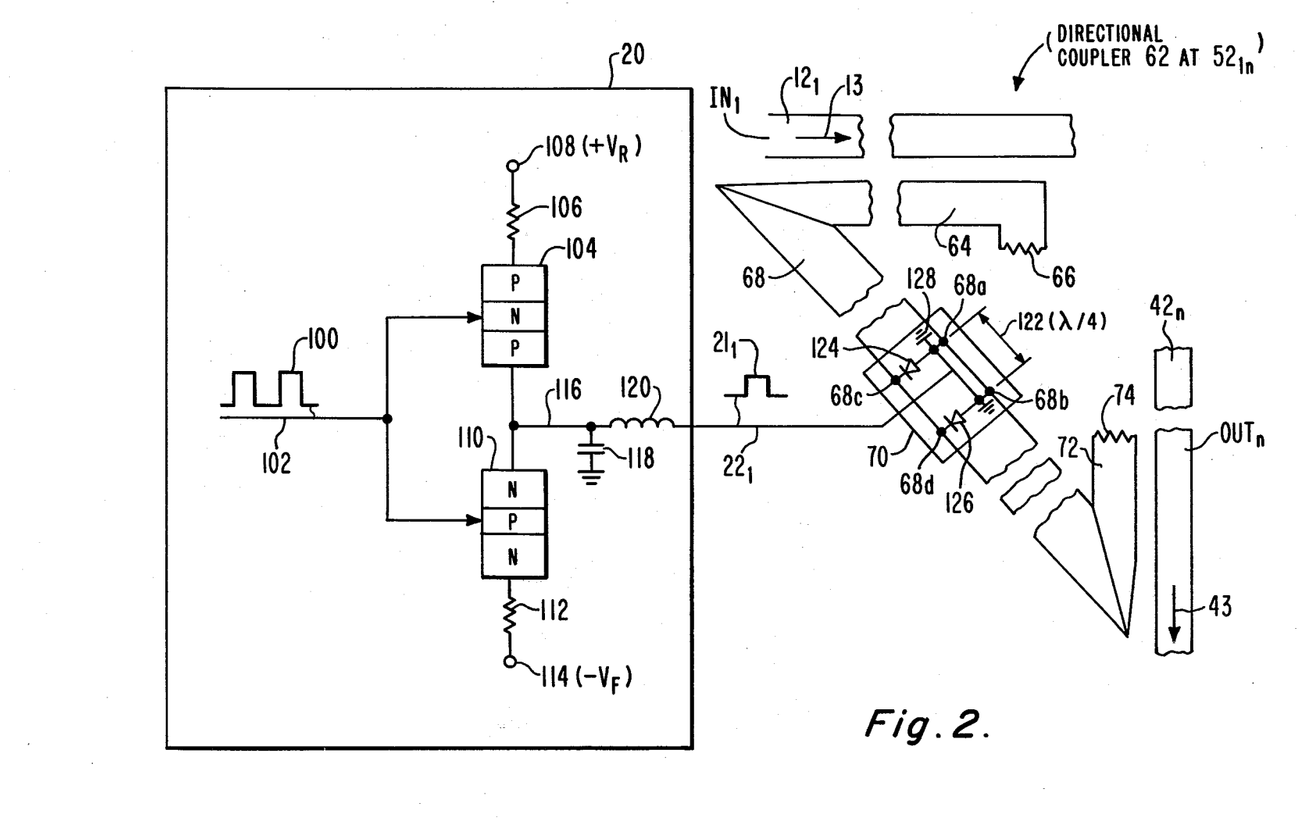
FIG. 2 is a detailed schematic of the logic of controller 20 shown in FIG. 1.

Shown in FIG. 2 is the circuitry of controller 20 which provides the control signal $21_1$ on signal bus $22_1$ that controls the operation of the directional coupler 62 located at the row 1—column n coordinate of matrix 50. Similar circuitry is also provided, but not shown, in controller 20 for each control signal $21_2$ ... $21_m$, $23_1$, $23_2$ ... $23_m$, $25_1$, $25_2$ ... $25_m$, $31_1$, $31_2$ ... $31_m$, $33_1$, $33_2$ ... $33_m$, $35_1$, $35_2$ ... $35_m$, conducted by signal paths $22_2$ ... $22_m$, $24_1$, $24_2$ ... $24_m$, $26_1$, $26_2$ ... $26_m$, $32_1$, $32_2$ ... $32_m$, $34_1$, $34_2$ ... $34_m$, $36_1$, $36_2$ ... $36_m$ respectively. Also shown in FIG. 2 is a microwave switch 70 positioned within directional coupler 62 located at the row 1—column n coordinate of matrix 50. Microwave switch 70 has positioned within it PIN diodes 124 and 126.

Controller 20 provides the electrical signal $21_1$ to signal path $22_1$ connected to the pair of PIN diodes 124 and 126 located within microwave switch 70. The voltage level of signal $21_1$ determines if the pair of PIN diodes 124 and 126 are foward or reversed biased. The bias condition of diodes 124 and 126 determines if microwave switch 70 is "ON" or "OFF." The "ON"-"OFF" state of microwave switch 70 determines if directional coupler 62 couples a signal conducted by a row microstrip $12_1$, to a column microstrip $42_n$. The activation of signal $21_1$ is determined by the presence or absence of sample signal 100 applied to controller 20, via a signal path 102, from an external source not shown.

Figure 4:
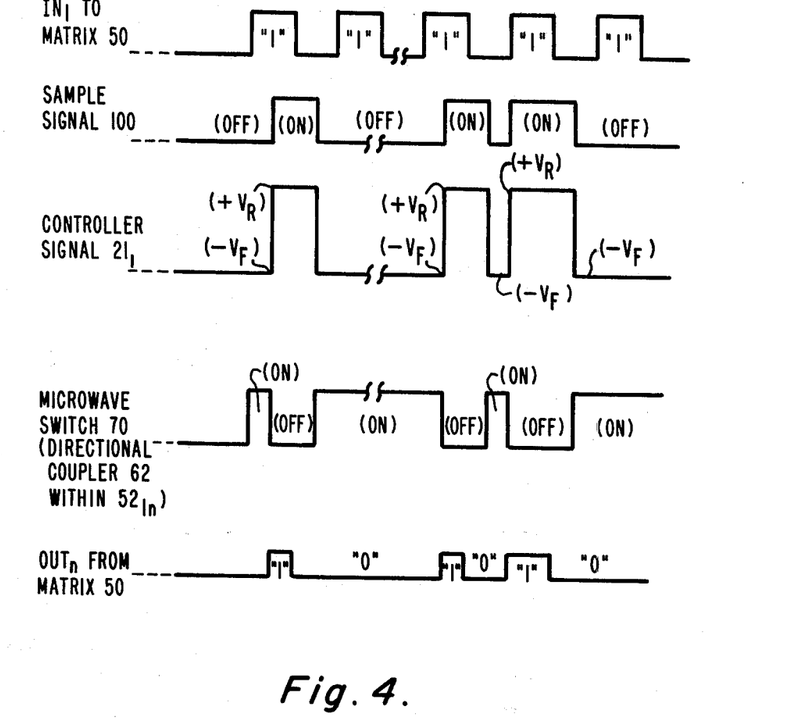
FIG. 4 is a timing chart which illustrates the related events between controller 20 and directional coupler 62.

FIG. 4 shows the events initiated by the sample signal 100 for one example of signal $IN_1$ being coupled to signal $OUT_n$. In the absence of signal 100, shown as the "OFF" state, signal $21_1$ is at a negative voltage level $(-V_F)$ correspondingly causing PIN diodes 124 and 126 to be forward-biased which in turn places microwave switch 70 "ON". When microwave switch 70 is "ON" signal $IN_1$ is not coupled to signal $OUT_n$. The occurrence of signal 100, that is a positive signal shown as the "ON" state, causes signal $21_1$ to become a positive voltage level $(+V_R)$ which causes PIN diodes 124 and 126 to be reversed-biased and thus turns microwave switch 70 "OFF." When microwave switch 70 is "OFF" and signal $IN_1$ is present, that is a positive signal shown as the "1" condition, directional coupler 62 couples signal $IN_1$ to signal $OUT_n$. The presence of signal $OUT_n$ is shown as a positive signal "1." It should be recognized that signal $OUT_n$ occurs only when sample signal 100, control signal $21_1$ and $IN_1$ are present. Accordingly, in the absence of either of these signals 100, $21_1$, or $IN_1$, signal $OUT_n$ is absent and shown as "0" condition.

Referring now to FIG. 2, the bias level signal $21_1$ of the diodes, is developed by a pair of complementary PNP/NPN transistors 104 and 110 respectively. The conductive states of the transistor pair 104 and 110 are determined by the presence or absence of a sample signal 100. If signal 100 is not present on path 102, transistor 110 is in a conductive state (ON) transistor 104 is in a non-conductive state (OFF) thus providing a negative voltage level via a load resistor 112 and a negative voltage supply 114, such as −5.0 volts. The negative voltage level causes PIN diodes 124 and 126 to be forward-biased. A positive voltage signal 100 on signal path 102 switches transistor 110 from its conductive state (ON) to its non-conductive state (OFF) and also switches transistor 104 from its non-conductive state (OFF) to its conductive state (ON). The conductive state of transistor 104 provides a positive voltage level, via a load resistor 106 and a positive voltage supply 108 such as +5.0 volts, to cause PIN diodes 124 and 126 to be reversed-biased. As previously discussed, PIN diodes 124 and 126 when in a forward-biased condition turns switch 70 "ON." Conversely, PIN diodes 124 and 126 when in a reversed-biased condition turns switch 70 "OFF.".

Each of PIN diodes 124 and 126 has its negative electrode (cathode) connected to the conductive strip of microstrip segment 68 at locations 68c and 68d, respectively, and its positive electrode (anode) connected to the ground plane 128 of directional coupler 62 at locations 68a and 68b respectively. The spacing between locations 68c–68d, is equal to a distance 122 of one-quarter wavelength ($\lambda/4$) of the center frequency of the frequency spectrum of signals $IN_1$, $IN_2$ ... $IN_m$. The frequency spectrum of $IN_1$, $IN_2$ ... $IN_m$ is the same as the bandwidth, about the center frequency of signals $IN_1$, $IN_2$ ... $IN_m$, of switching matrix 50. The parameters of directional couplers 62 and 76, such as distance 122, are chosen to operate over the frequency spectrum of input signals $IN_1$, $IN_2$ ... $IN_m$. The equivalent electrical distance 122 of $\lambda/4$ is provided by lumped circuit components (not shown) within microwave switch 70.

PIN diodes 124 and 126, when energized in a forward-biased condition by controller 20, present effectively a short circuit to microwave signals present on microstrip segment 68. The inherent effect of the microwave short circuit of the diodes reflects the energy of the microwave signal conducted by segments 64 and 68 back to the terminating load 66 where the energy is dissipated. Thus the coupled signal of $IN_1$ is prevented from being passed to microstrip $42_n$ as signal $OUT_n$. Conversely, PIN diodes 124 and 126, when energized in a reverse-biased condition by controller 20, present an open circuit across the conductive microstrip segment 68 and its ground plane 128. The open circuit allows the coupled signal of $IN_1$, to be conducted by microwave segments 68 and 72 and coupled to microstrip $42_n$ as a signal $OUT_n$. Power isolation between controller 20 having d.c. level signals such as the bias signal $21_1$ for diodes 124 and 126, and directional coupler 62 conducting high frequency microwave signals, is provided by blocking capacitor 118 and inductor 120 located within controller 20.

OPERATION OF THE REDUNDANT MICROWAVE SWITCHING MATRIX

The operation of switching matrix 50 will be described in conjunction with FIGS. 1, 2, and 3. The applied signals IN are conducted by and coupled to selected output signals OUT by matrix 50 controlled by controller 20. The power distribution network provided by directional couplers 62 and 76 distributes equally the power of one or more applied signals $IN_1$, $IN_2$ ... $IN_m$ among one or more signals $OUT_n$ ... $OUT_2$ and $OUT_1$, noting that functional and device redundancy of the matrix 50 is provided in the embodiment.

Directional couplers 62 and 76 operate in a known manner such that when positioned adjacent to a conducting microstrip they couple a portion of the energy of a forward traveling wave, referred to as the incident wave, from the conducting microstrip. The amount of the incident signal coupled to the directional coupler is determined by the spacing between the microstrip and the directional couplers. The aforementioned technical article "Characteristics of Coupled Microstrip Lines,"

describes the parameters of directional couplers that determine the ratio of power coupling.

FIG. 3 is arranged to provide three examples, viz., #1, #2, #3, for illustrating the flow of three signals $IN_1$, $IN_4$, and $IN_8$ coupled by matrix 50 to form three signals $OUT_8$, $OUT_5$, and $OUT_3$ respectively. For the illustrated examples 1, 2, and 3, directional coupler 76 of coupler $52_{18}$, directional coupler 62 of coupler $52_{45}$ and directional coupler 62 of coupler $52_{83}$, respectively, are enabled by controller 20.

Referring to example #1, the flow of the applied signal $IN_1$ to microstrip $12_1$ is indicated by a plurality of curved arrows at all the intercepting directional couplers 62 and 76. Signal $IN_1$ of example 1, having the directional coupler 76 of coupler $52_{18}$ enabled, will encounter all the directional couplers positioned adjacent to microstrip $12_1$ and also all the directional couplers positioned adjacent to microstrip $42_8$. At each directional coupler encountered by $IN_1$ a signal related by a predetermined power ratio, in accordance with equations (1), (2), (3), and (4), is coupled from the signal $IN_1$. The total power reduction to signal $IN_1$, developed by matrix 50 as signal $OUT_8$, is $(1/17) \times (1/17)$ of the initial signal power applied to microstrip $12_1$. The $(1/17) \times (1/17)$ power reduction is encountered by all signals $IN_1$, $IN_2$ ... $IN_m$ applied to and routed by matrix 50. The commonality of the $(1/17) \times (1/17)$ power reduction provides equal power distribution of one or more applied signals among one or more output signals.

Signal $IN_1$, of example 1, first encounters directional coupler 62 of coupler $52_{18}$ whereby a signal of predetermined power ratio of $IN_1$ is coupled to directional coupler 62. Directional coupler 62 has not been enabled by controller 20 and thus the coupled signal is dissipated within internal terminator 66 (shown in FIG. 1). Signal $IN_1$ next encounters directional coupler 76 of coupler $52_{18}$ which has been enabled by controller 20. Directional coupler 76 ($52_{18}$) couples a portion of signal $IN_1$ to microstrip $42_8$. The coupled signal of $IN_1$, now conducted by microstrip $42_8$, next encounters directional coupler 62 of coupler $52_{18}$. The portion of signal $IN_1$, coupled to directional coupler 62 ($52_{18}$) is dissipated by the internal terminating load 74 (shown in FIG. 1.) After the remainder signal of the coupled signal of $IN_1$ conducted by microstrip $42_8$ passes directional coupler 62, it encounters directional couplers 76 and 62, located at column 8, rows 2, 3, 4, 5, 6, 7, and 8 and predetermined power ratios of the signal is coupled to each respective directional coupler 76 and 62. The power of signal $IN_1$ exiting matrix 50 as signal $OUT_8$ is $(1/17) \times (1/17)$ of the initial power of signal $IN_1$ applied to microstrip $12_1$. The applied signal $IN_1$, after it has past directional coupler 76 of coupler $52_{18}$, further encounters directional couplers 62 and 76 located at row 1, columns 7, 6, 5, 4, 3, 2, and 1, whereby a predetermined power ratio of signal $IN_1$ is coupled to each respective directional coupler. The remaining power of signal $IN_1$ is dissipated by terminator 90 of microstrip $12_1$.

Example 2, shown in FIG. 3, is similar to example 1 except for the coordinate within matrix 50 in which the directional coupler, for example 2, is enabled by controller 20. Example 2 has directional coupler 62 of coupler $52_{45}$ enabled. Signal $IN_4$, of example 2, is applied to row 4 of matrix 50 and is conducted by microstrip $12_4$. Signal $IN_4$ initially encounters directional couplers 62 and 76 at row 4, columns 8, 7, 6. These directional couplers are not enabled by controller 20 and the predetermined power of signal $IN_4$ coupled to them is dissipated by their internal terminator. Signal $IN_4$ first encounters an enabled directional coupler 62 of coupler $52_{45}$ and a predetermined power ratio of signal $IN_4$ is coupled to the microstrip $42_5$. The coupled signal of signal $IN_4$ is conducted by microstrip $42_5$ and further encounters directional couplers 76 and 62 positioned at column 5, rows 5, 6, 7, and 8, whereby a predetermined power ratio of signal $IN_4$ is coupled to each respective directional coupler and dissipated by their internal terminations. The power of signal $IN_4$ which exits matrix 50 as signal $OUT_5$ is $(1/17) \times (1/17)$ of the total power of signal $IN_4$ applied to matrix 50.

Example 3, of FIG. 3, is similar to examples 1 and 2 except that directional coupler 62 of coupler $52_{83}$ is enabled by controller 20. Signal $IN_8$, of example 3, applied to and conducted by microstrip $12_8$ encounters non-enabled directional coupler 62 and 76 at row 8, columns 8, 7, 6, 5, and 4, whereby a signal of a predetermined ratio of the power of signal $IN_8$ is coupled to each respective directional coupler. Signal $IN_8$ first encounters an enabled directional coupler 62 of coupler $52_{83}$, whereby a predetermined portion of signal $IN_8$ is coupled to microstrip $42_3$, and exits matrix as signal $OUT_3$. As similarly discussed for signal $OUT_8$ and $OUT_5$, the power of signal $OUT_3$ exiting matrix 50 is $(1/17) \times (1/17)$ of the initial power of signal $IN_8$ applied to matrix 50. It should now be appreciated that the power of one or more signals applied to one or more rows of matrix 50 is divided by predetermined power ratios of intercepting directional couplers 62 and 76 such that the power of one or more applied signals is equally distributed among one or more output signals enabled by controller 20.

According to the invention, matrix 50 couples one or more of the given signals $IN_1$, $IN_2$ ... $IN_m$ applied to one or more of the horizontal busses $12_1$, $12_2$ ... $12_m$, respectively, to one or more of the vertical busses $42_n$ ... $42_2$, and $42_1$ by the switching of one or more of the two directional couplers 62 or 76, such that, the absolute power of the signals $IN_1$, $IN_2$ ... or $IN_m$ coupled to the vertical busses $42_n$ ... $42_2$, $42_1$, and exiting as signals $OUT_n$, ... $OUT_2$, $OUT_1$ respectively, is substantially the same. Furthermore, according to the invention, each directional coupler 62 or 76, situated at the coordinate cross points, is selectively enabled to independently provide the switching function. Accordingly, a malfunction of one directional coupler of each pair 62 and 76, due to an open circuit malfunction, as distinguished from a short circuit malfunction, can be overcome by simply disabling the malfunctioning coupler and enabling the remaining coupler. The capability of independently operating directional couplers 62 and 76 to accomplish the required switching is termed for the purpose of this description the functional redundancy of matrix 50. Reference is made to FIG. 1 for an understanding of the operation of switching matrix 50 regarding functional redundancy.

As illustrated in FIG. 1, controller 20 selectively controls the plurality of directional couplers 62 and 76 located at each coordinate of matrix 50. The plurality of directional couplers 62, located at each coordinate, are selectively controlled by controller 20 via signal paths $22_1$, $22_2$ ... $22_m$, $24_1$, $24_2$ ... $24_m$, $26_1$, $26_2$ ... and $26_m$. Signal paths $22_1$, $22_2$ ... $22_m$, $24_1$, $24_2$ ... $24_m$, and $26_1$, $26_2$ ... $26_m$ are connected to the directional coupler 62 at columns $n$, ... 2 and 1 respectively. Signal busses $22_1$, $22_2$ ... $22_m$, $24_1$, $24_2$ ... $24_m$, and $26_1$, $26_2$ ... $26_m$ are the primary control paths for matrix 50. The plurality of directional couplers 76, located at each coordinate are selectively controlled by controller 20 via signal paths $32_1, 32_2 \ldots 32_m, 34_1, 34_1, 34_2 \ldots 34_m$, and $36_1, 36_2 \ldots 36_m$.

Signal paths $32_1, 32_2 \ldots 32_m, 34_1, 34_2 \ldots 34_m$, and $36_1, 36_2 \ldots 36_m$ are connected to directional couplers at 76 at column $n, \ldots 2$ and $1$ respectively. Signal paths $32_1, 32_2 \ldots 32_m, 34_1, 34_2 \ldots 34_m$ and $36_1, 36_2 \ldots 36_m$ are the alternate control paths for matrix 50. The primary paths are normally used by controller 20 to selectively enable one or more of the directional couplers 62 via microwave switch 70, and thus couple one or more of the signals $IN_1, IN_2 \ldots IN_m$ equally among one or more of the signals $OUT_n, \ldots OUT_2, OUT_1$. The alternative paths are back-up paths used by controller 20 when any of the primary paths are inoperative.

The selective enablement, by controller 20, of couplers 62 allows the input signals $IN_1, IN_2 \ldots IN_m$ associated with antennas $10_1, 10_2 \ldots 10_m$ respectively, to be selectively routed to transmitting antenna $40_n \ldots 40_2, 40_1$. As previously discussed, antennas $10_1, 10_2 \ldots 10_n, 40_n \ldots 40_2$ and $40_1$, are typically oriented on the satellite to zones related to predetermined earth locations. Typically, an interchange of information between the zones is desirable. The interchange of information may be arranged to occur at a predetermined time sequence. For example, (1) during the first second input signal $IN_1$ is coupled by controller 20 to antenna $40_1$, (2) during the next second the input signal $IN_2$ is coupled by controller 20 to antenna $40_n$, (3) and finally during this third second $IN_m$ is coupled by controller 20 to antenna $40_2$. Controller 20 normally uses the primary paths to selectively enable directional coupler 62 located at each matrix 50 coordinate. If any primary path becomes inoperative controller 20 uses the alternate path to selectively enable directional coupler 76 located at each matrix 50 coordinate.

The most probable failure to cause primary path $22_1, 22_2 \ldots$ etc. to become inoperative are diode failures, 124 and 126, located within microwave switch 70. Referring to FIG. 2, related to signal bus $22_1$, if either diode 124 or 126 fail in an "open" condition, the other diode 126 or 124 is selected by controller 20 and thus performs the required switching function of microwave switch 70, such as allowing signal $IN_1$ to be coupled to microstrip $42_n$ as signal $OUT_n$. If either diode 124 or 126 fail in a "shorted" condition, then the respective microwave switch 70 is inoperative thus causing the associated primary path to be inoperative. A "shorted" diode, 124 or 126, places a short circuit across the microstrip segment 68. The short circuit reflects the microwave signal conducted by microstrip segment 68 back to terminator 66, where the microwave signal is dissipated. Thus, a "shorted" diode places microwave switch 70 in a "fail-safe" condition, that is, even though microwave switch 70 is inoperative, and thus failed, it is in a safe condition that prohibits a coupled signal, such as $IN_1$, to undesirably pass onto the conductive strip 42 as signal $OUT_n$. The occurrence of one "shorted" diode, 124 or 126, causing microswitch 70 to be inoperative may be prevented by adding serially connected diodes in each path of diodes 124 and 126. If any of the serial diodes fail in a "shorted" condition, the resistance of the other serially connected diodes will prevent a short circuit from being placed across the microstrip segment 68. The non-short circuit allows microwave switch 70 to continue its switching function. It should be recognized that the addition of diodes to the paths of diodes 124 and 126 increases the short circuit resistance of microwave switch 70, when the diodes 124, 126, etc. are placed in a forward-biased condition. The forward-biased condition of diodes 124 and 126 prevents the coupled signal of $IN_1$ from passing onto microstrip $42_n$ as signal $OUT_n$. The short circuit condition, that is, the very low resistance of the forward-biased diodes 124, 126, etc., essentially provides the isolation impedance between microstrips $42_n$ and $12_1$. Thus, the impedance isolation between microstrips $42_n$ and $12_1$ is inversely proportional to the resistance value of the forward-biased diodes 124, 126, etc,. Increasing the resistance value of the forward-biased diodes 124, 126, etc. decreases the impedance isolation between microstrips $42_n$ and $12_1$. Conversely, decreasing the resistance value of the forward-biased diodes 124, 126, etc. increases the impedance isolation between microstrips $42_n$ and $12_1$.

It should now be appreciated that the reliability of the preferred embodiment of microwave switch 70 having two shunted diodes 124 and 126 may be further improved by adding serially connected diodes in the path of diodes 124 and 126. However, by serially adding diodes to shunted diodes 124 and 126, the isolation between the applied signal and the output signal, such as $IN_1$ and $OUT_n$, respectively, decreases accordingly. Furthermore, it should be recognized that the duality of diodes 124 and 126 provides microwave switch 70 and thus directional coupler 62 with device redundancy.

The functional redundancy provided by independant operation of the primarily controlled directional coupler 62 and the alternately controlled directional coupler 76 located at each coordinate, and the device redundancy of directional couplers 62 and 76 provides matrix 50 with a high degree of flexibility and reliability. The flexibility of matrix 50 may be used by systems such as communications satellites having the requirement that a failure within any equipment may not cause the complete communication satellite to be inoperative. As previously explained, one or more failures may occur in any directional coupler 62 located at a particular column of matrix 50 and that directional coupler 62 may be disabled and the alternate directional couplers 76, located at the malfunctioning column of matrix 50, may be enabled allowing the operation of the complete communication to continue. The reliability of matrix 50 provided by functional and device redundancy is also advantageous to communication satellites. When a communication satellite is launched into orbit it remains unattended by skilled technicans for the remainder of the orbital life. If an equipment failure occurs in this unmanned environment the useful life of the communication satellite is shortened. Thus, the equipment, such as matrix 50, placed in the orbiting satellite must be highly reliable.

Although the invention has been described for use in communication satellites, those skilled in the art will recognize the principles of the invention are readily adapted to other types of microwave systems such as ground-based communication relay stations.

What is claimed is:

1. A redundant microwave switching matrix that distributes the power from a plurality of input microwave signals equally to a plurality of output paths, said matrix comprising:

a plurality of strip transmission lines spaced from each other and arranged in rows and columns, the crossings of which form coordinates of said matrix;

a pair of controllable microwave power couplers positioned diametrically opposite each other at each coordinate of said matrix, each of said power couplers responsive to a control signal for coupling according to a given power ratio a given amount of power of said input signal propagating along an associated row oriented transmission line to an associated column oriented transmission line and responsive to the absence of said control signal for interrupting said coupling, said power ratio being greater than zero and being the same for all couplers; and means for providing said control signal to either one of said pair of power couplers whereby in the event of failure of one of the pair of power couplers at any coordinate the other power coupler at that coordinate provides the coupling at the same power ratio.

2. A redundant microwave switching matrix according to claim 1, wherein said strip transmission lines comprise a microstrip having a single ground plane on one side of a substrate and a narrow conductive strip on the opposite side of said substrate.

3. A redundant microwave switching matrix according to claim 1, wherein each of said microwave power couplers is comprised of quadrature directional couplers having predetermined power coupling coefficients and terminated in an impedance substantially equal to the characteristic impedance of said strip transmission lines.

4. A redundant microwave switching matrix according to claim 1, wherein each of said controllable microwave power couplers includes a transmission line and a pair of PIN diodes shunted across said power coupler transmission line.

5. A redundant microwave matrix according to claim 4, wherein said pair of PIN diodes are spaced apart from each other a distance equal to one-quarter wavelength of the center frequency of the frequency spectrum of said microwave input signals.

* * * * *